United States Patent [19]

Nakamura et al.

[11] 4,055,740
[45] Oct. 25, 1977

[54] INDUCTION HEATING APPARATUS USING A SATURABLE REACTOR FOR POWER CONTROL PURPOSES

[75] Inventors: Masatatsu Nakamura; Hideyuki Kominami; Keizo Amagami; Takao Kobayashi; Tadao Toyooka, all of Kadoma, Japan

[73] Assignee: Matsushita Electric Industrial Company, Japan

[21] Appl. No.: 666,973

[22] Filed: Mar. 15, 1976

[30] Foreign Application Priority Data

Mar. 19, 1975 Japan .................................. 50-34052

[51] Int. Cl.² .............................................. H05B 5/04
[52] U.S. Cl. .......................... 219/10.49 R; 219/10.77; 323/45; 323/51; 363/91
[58] Field of Search ............... 219/10.49, 10.77, 10.75; 321/16, 18, 19, 25; 323/45, 89 C, 51

[56] References Cited

U.S. PATENT DOCUMENTS

| 2,399,185 | 4/1946 | Hedding | 323/45 |
|---|---|---|---|
| 2,825,024 | 2/1958 | Berghoff | 323/45 |
| 2,830,256 | 4/1958 | Bale | 323/45 |
| 3,178,696 | 4/1965 | Claflin | 323/51 |
| 3,596,172 | 7/1971 | Harrison | 323/45 |
| 3,716,719 | 2/1973 | Angeleny et al. | 323/51 |
| 3,806,792 | 4/1974 | Untamo | 321/25 |
| 3,978,307 | 8/1976 | Amagami et al. | 219/10.49 |

FOREIGN PATENT DOCUMENTS

| 2,504,827 | 8/1975 | Germany | 219/10.49 |
|---|---|---|---|
| 716,114 | 9/1954 | United Kingdom | 219/10.75 |

*Primary Examiner*—Bruce A. Reynolds
*Attorney, Agent, or Firm*—Robert E. Burns; Emmanuel J. Lobato; Bruce L. Adams

[57] ABSTRACT

An induction heating apparatus includes a saturable reactor having a pair of rectangular ferrite cores. An air gap is provided in each ferrite core to provide a gradually increasing saturation characteristic on the magnetization curve of the cores. A pair of series-connected load windings is coiled around each core and a control winding is coiled around a common magnetic path of the cores. A power control circuit produces a DC control current that passes through the control winding. The high frequency energization current is passed through the load windings. Means are provided to control the DC control current at a desired setting. Preferably, the actual power level is detected to control the DC current through a feedback loop.

12 Claims, 7 Drawing Figures

TO DIODE 304
TO DELAY CCT 312

TO DIODE 304
TO DELAY CCT 312

INDUCTION HEATING APPARATUS USING A SATURABLE REACTOR FOR POWER CONTROL PURPOSES

The present invention relates generally to induction heating apparatus, and specifically it relates to an induction heating apparatus which includes a saturable reactor for power control purposes.

An induction heating apparatus comprises a power converter generating an energization current at a frequency of the order of 20–30 kHz and an induction heating coil energized by the high frequency current to induce eddy currents in a magnetic cooking ware placed over the induction heating coil. Controlling the output power of the converter at a desired level for different cooking conditions necessarily controls the high frequency energization current. Hitherto, there has been proposed a method for controlling the frequency of the energization current for power control purposes. Although the frequency control approach is suitable for automatic power control, a wide range of power control is difficult to achieve because of the limited range of frequencies for induction heating. A variable inductor may be a convenient choice for power control. However, automatic power control would involve a mechanical linkage which controls the inductive reactance of the inductor in response to a control signal. This increases the likelihood of false operation due to mechanical wear or requires an additional space.

An object of the present invention is therefore, to provide an improved induction heating apparatus which comprises a saturable reactor having a gradually increasing saturation characteristic on a magnetization curve for high frequency operation.

The saturable reactor in accordance with the invention includes a pair of rectangular ferrite cores around which are coiled load windings connected in series to receive the high frequency energization current and a control winding. The direction of magnetization of the cores due to the load windings is such that there is no signal induced by energization of the load windings. Each of the cores include an air gap which increases the magnetic resistance of the ferrite core, and as a result the magnetic intensity of the cores increases gradually with the magnetic field induced by the DC control current. In manual mode of operation, the control current is directly controlled by a variable resistor connected to a DC voltage source. In automatic mode of operation, the control current is provided from a comparator which compares the actual power level with a desired power level set by the user.

These and other objects, advantages and features of the invention will be understood from the following description taken in conjunction with the accompanying drawings, in which.

Figure 1:
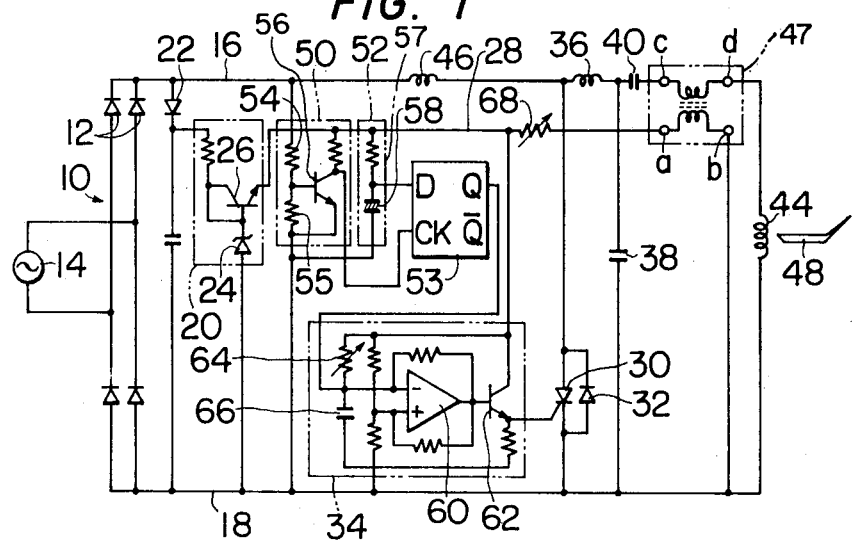
FIG. 1 is a circuit diagram of a first embodiment of the invention.

Referring now to FIG. 1, an induction heating apparatus incorporating a novel saturable reactor is shown and comprises a full wave rectifier 10 formed by four diodes 12 adapted to be connected to a source 14 of alternating current potential available from household current outlet to supply a full-wave rectified unfiltered unidirectional voltage to a pair of lines 16 and 18 with the former being positive with respect to the latter. To the positive line 16 is connected through a diode 22 a DC voltage source or voltage stabilizing circuit 20 formed by a break-down diode 24 and a transistor 26 in a well known circuit configuration to supply a constant DC voltage on line 28.

The full-wave rectifier 10 supplies the full-wave rectified excitation potential for a power converter circuit comprised by a thyristor switching device formed by a power rated SCR 30 and reversely poled parallel connected feedback diode 32, and a resonant or commutating load circuit formed by a commutating inductor 36, a commutating capacitor 38, a filter capacitor 40, the load winding of a saturable reactor 42 in accordance with the invention and an induction heating coil 44. SCR 30 and feedback diode 32 are connected across the lines 16 and 18 through a filter inductor 46 interposed in the line 16 and serve to excite the commutating circuit at a relatively high frequency of the order of 20–30 kHz.

The excitation of the commutating circuit takes place by repetitious on-off switching action of the SCR 30 producing a forward current flow through the conducting SCR 30 during the first half cycle of oscillation and a reverse current flow through the feedback diode 32 during the second half cycle. The commutating inductor 36 and commutating capacitor 38 are connected in series across the thyristor switching device. The filter capacitor 40, the load winding of reactor 42 and the induction heating coil 44 are all connected in series across the commutating capacitor 38 to produce a flow of energization current through the induction coil 44 which electromagnetically couples with a cooking ware 48 of magnetic material disposed in overlying relation therewith.

The on-off switching action of SCR 30 is controlled by gating-on pulses supplied through a gating circuit 34 which is in turn controlled by a zero crossover detector 50 and an inhibit delay circuit 52 through a coincident circuit or trigger pulse generator formed by a D-type flip-flop 53. The zero crossover detector 50 comprises a voltage divider formed by a pair of series-connected resistors 54, 55 connected across the lines 16 and 18 and a transistor 56 having its base connected to a point intermediate the resistors 54 and 55 and its collector connected to the DC supply line 28 and its emitter connected to the negative line 18. When the full-wave rectified unfiltered voltage approaches a zero potential, the transistor 56 is rendered non-conductive resulting in a rise in potential at the collector electrode. This high potential is coupled to the clock input terminal of the D-type flip-flop. This flip-flop can only change to the binary logic state present on its data input at the time the clock pulse occurs. The signal on the data input of flip-flop 53 is supplied from the inhibit delay circuit 52 comprised by a resistor 57 and a capacitor 58 connected in series to the DC supply 28 and negative terminal 18. The voltage developed across the capacitor 58 rises expotentially at a rate determined by the RC time constant from the instant the power converter is connected to the power supply source 14. The junction between the resistor 57 and capacitor 58 is connected to the data input of flip-flop 54. After the elapse of a predetermined duration, the binary state of the data input changes to "1". The flip-flop 54 thus produces an output upon the occurrence of a first zero potential of the input power after the predetermined period has elapsed from the time of energization of the power converter. This ensures against misfiring of the SCR 30 due to the lack of sufficient energy in the commutating capacitor 38 during the start-up period of the apparatus.

The output from the flip-flop 54 is fed to the gating circuit 34 which comprises an operational amplifier 60 with both of its inverting and noninverting input terminals connected through feedback resistors to its output terminal. An output transistor 62 is connected to apply an amplified signal to the inverting input through a feedback resistor 64. The output transistor 62 is connected in an emitter-follower configuration to the control gate of the SCR 30 to feed a train of gating-on pulses.

Upon the application of gating-on pulse to the control gate of SCR 30, the charge stored on capacitor 38 will be oscillated through the now conducting SCR 30 and through inductor 36 to reversely charge capacitor 38 and turn-off SCR 30. Upon turn-off of SCR 30, the reverse polarity charge on capacitor 38 and the collapsing lines of flux in 36 causes a reverse current flow back through the feedback diode 32 to return capacitor 38 to substantially its originally charged condition minus any losses due to loading on induction heating coil 44. During this reverse current flow SCR 30 will be reverse biased and will be maintained off. Upon completion of the reverse current flow, feedback diode 32 will revert to its blocking condition thereby completing one oscillation. Upon the application of another gating-on pulse to the SCR 30, the cycle is repeated. The frequency of application of gating-on pulses is determined by the time constant of an RC network formed by the resistor 64 and a capacitor 66 and in turn determines the frequency of energization current through the commutating load circuit.

Figure 2:
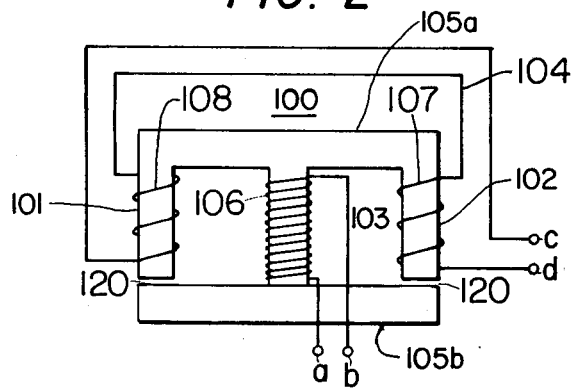
FIG. 2 is a saturable reactor of the invention.
Figure 3:
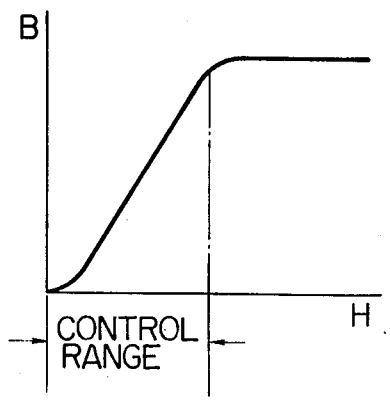
FIG. 3 is a graph illustrating the magnetization curve of the saturable reactor of FIG. 2.

The saturable reactor 42 according to the invention is shown in FIG. 2 which comprises a core 100 which in the example shown is formed of ferrite material. Such core is of rectangular shape to provide a closed magnetic circuit and is provided with three parallel limbs 101, 102 and 103 which are connected together by a transverse member 105a to form an E-shaped ferrite core, and another transverse member 105b opposite the transverse member 105a. An air gap 120 is provided between each of the outer limbs 101 and 102 and the transverse member 105b. A control winding 106 is wound on the center limb 103 and fed with a DC current supplied from terminals a and b which are in turn connected to the DC supply line 28 through a variable resistor and to the negative bus 18, respectively, as shown in FIG. 1. Load windings 107 and 108 having equal turns are wound on the outer limbs 101 and 102, respectively in opposite directions and connected in series together to terminals c and d which are in turn connected to filter capacitor 40 and to induction heating coil 44, respectively, so that the electromagnetic force in the center limb 103 resulting from the passage of high frequency energization current through the load windings 102 and 103 is cancelled out. These characteristics are obtained through the use of ferrite. The ampere-turn of the control winding 106 is greater than that of each load winding so that it produces a sufficient number of lines of flux to dominate the magnetic path in a relatively wide range. Because of the provision of the air gaps 120, the lines of flux produced by the control winding 106 tend to leak, and as a result the magnetic intensity of the core increases gradually as a function of the DC magnetic field until it reaches a saturation point. This produces a magnetization curve having a gradual slope ranging from the point of origin to saturation as shown in FIG. 3. By altering the DC magnetic field in a range from the point of origin to the knee of the curve, the impedance of the load windings can be continuously controlled, and hence the amplitude of the load current. With the saturable reactor 42 connected in the circuit of FIG. 1, the DC control fields in both magnetic loop circuits are controlled by the variable resistor 68 to control the magnitude of the energization current at a desired level. Because of the continuous change in amplitude, the output waveform of the power converter is free from radio interference which could otherwise be introduced if abrupt change occurs in the output waveform.

Figure 4:
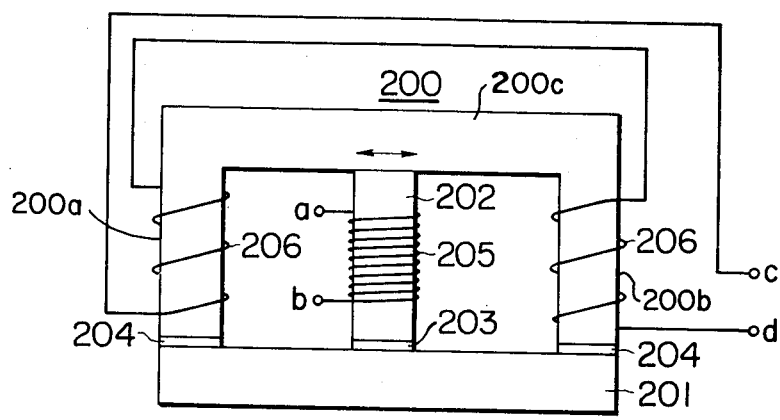
FIG. 4 is a modification of the saturable reactor of FIG. 2.

In FIG. 4, the ferrite core saturable reactor 42 of rectangular shape is formed by a U-shaped core 200 and a transverse member 201. The core 200 is formed by parallel limbs 200a and 200b and a transverse member 200c. This member 201 is secured to the end of the limbs 200a and 200b by means of a ferromagnetic spacer 204. A center limb 202 is laterally movably disposed between the transverse members 200c and 201 in parallel with the outer limbs 200a and 200b. A ferromagnetic spacer 203 of the same thickness as that of spacer 204 is also interposed between an end of the central limb 202 and member 201. This not only adds structural integrity to the core structure, but also meets precision requirements of the spacing between the end of the side legs and the member 201 which must be controlled within a small tolerable range. A control winding 205 is coiled around the core 202 and series-connected load windings 206 are coiled around the legs of the U core 200 in the same manner as described in connection with FIG. 2. Because of the U-shaped core structure, the center core 202 is movable transversely to its length as indicated by the arrow in the drawing by an amount which compensates for any unbalance in core 202 between the two opposite magnetic fields set up by the load windings 206 so that undesirable voltage which would otherwise develop in the control winding is completely suppressed.

Figure 5:
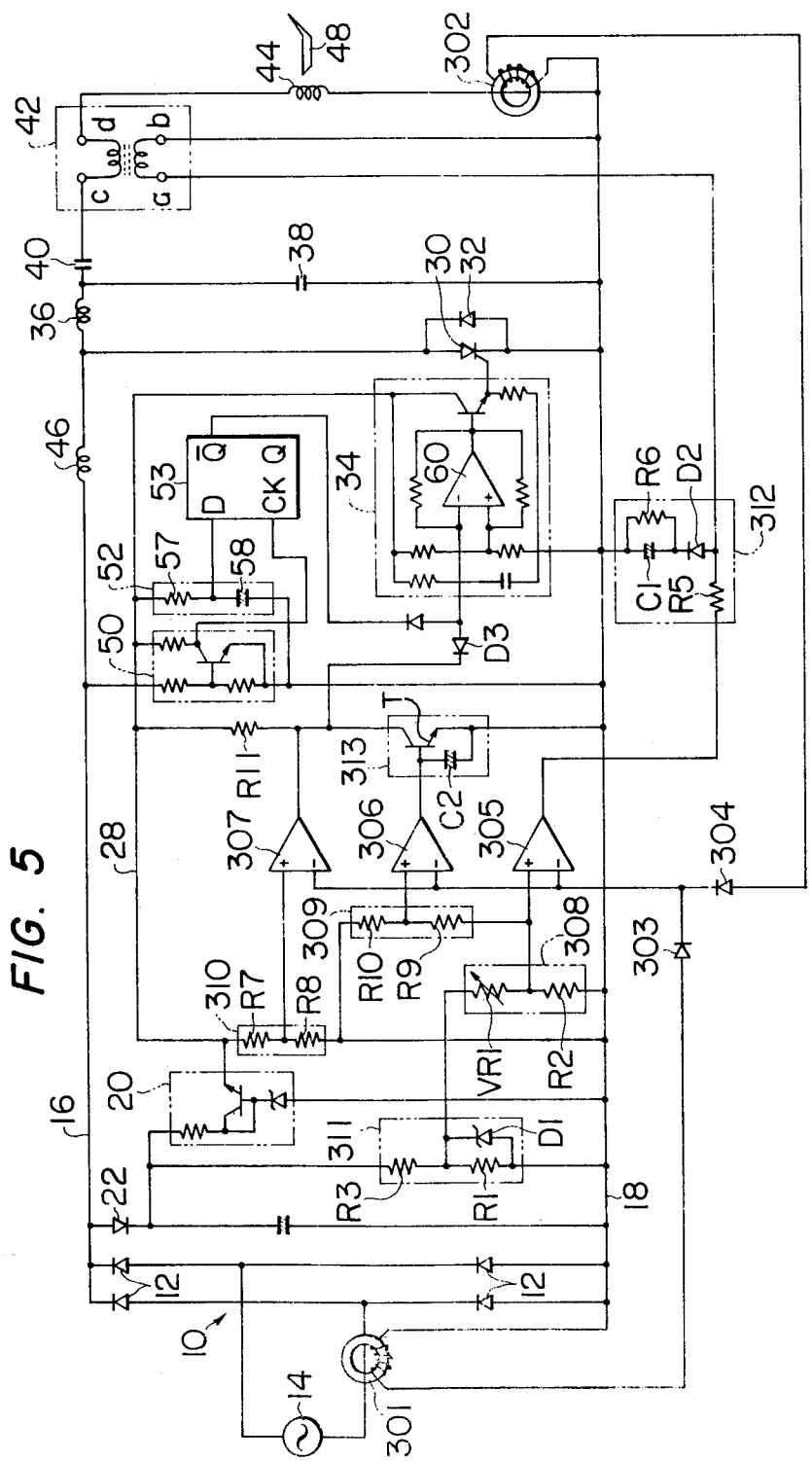
FIG. 5 is a circuit diagram of a second embodiment of the invention.

FIG. 5 illustrates a second embodiment of the invention in which automatic power control is achieved by passing through the reactor control winding a DC control current obtained by comparison of power levels detected with predetermined set values. In FIG. 5, identical parts are numbered with identical numerals to those used in FIG. 1. To achieve power level comparison, power level detectors formed by current transformers 301 and 302 are employed for respectively detecting the input and output power levels. Each of the current transformers are comprised by a ferrite ring core around which is coiled a winding. Through each ring core is passed a portion of the circuit to be detected to serve as a primary winding of the transformer. By transformer action a corresponding electrical signal is developed across the winding of the transformer. In the illustrative embodiment of the invention, the circuit between the power supply 14 and one of the rectifying diodes 12 is passed through the ring core of transformer 301 and its winding is connected between the negative terminal 18 and a diode 303, while the circuit between the induction heating coil 44 and negative line 18 is passed through the ring core of transformer 302 and its winding is connected between the negative line and a diode 304 whose cathode terminal is connected in common with the cathode of the diode 303 to the inverting input terminal of operational amplifiers 305, 306 and 307. In order to establish various setting levels, voltage dividers 308, 309 and 310 are provided. The voltage divider 308 comprising resistor R1 and R2 is connected to a voltage regulator 311 which is connected in parallel to the voltage stabilizer 20. The voltage regulator 311 comprises a pair of series-connected resistors R3 and R1, and a breakdown diode D1 connected across the resistor R1. From the junction between the resistors R3 and R1 a controlled voltage is supplied to the voltage divider 308. The breakdown diode D1 serves to prevent the voltage developed across resistor R1 exceeding the breakdown voltage should the input source voltage rise to an abnormally high voltage level. Before the breakdown voltage is reached, the voltage divider 308 is supplied with a full-wave rectified filtered unidirectional voltage which varies in accordance with the input source voltage.

The comparator operational amplifier 305 has its noninverting input connected to the junction between the resistors VR1 and R2 and its output connected by way of a resistor R5 of a delay circuit 312 to terminal *a* of reactor control winding and through terminal *b* to negative bus 18. The resistor VR1 is a variable resistor which is controlled by the user to provide desired setting level to which the output power level is controlled. The diodes 303 and 304 allow one of the detected signals from the transformers 301 and 302 which is higher than the other to pass therethrough to the inverting inputs of the comparators 305 to 307. The comparator 305 compares the selected one of the detected power indicating signal with the setting level on its non-inverting input and produces an output representing the difference between the two parameters being compared.

During the initial start-up period of operation of power converter, both detectors 301 and 302 produce substantially no output, and as a result the comparator 305 then produces a positive output of a substantial magnitude causing a flow of large initial current through the control winding. This undesirably reduces the initial inductive reactance of the saturable reactor 42 to cause the power converter to generate a large energization current flow through the induction heating coil 44. In order to prevent this initial large current flow, the delay circuit 312 is connected between the output of comparator 305 and negative bus 18. This delay circuit comprises a diode D2 having its anode terminal connected between terminal *a* of reactor 42 and resistor R5, and parallel-connected resistor R6 and capacitor C1 placed between the cathode terminal of D2 and negative bus 18. The initial output from the comparator 305 will charge up the capacitor C1 through diode D2 at a rate determined by the time constant of R5 and C1. Due to the charging action the initial current is prevented from entering the reactor control winding. The diode D2 serves to prevent the capacitor C1 from discharging its stored energy to the control winding when the user-controlled resistor R1 is varied to a new setting level. The charge stored on C1 will be discharged through R6.

The voltage divider 310 comprising a pair of series-connected resistors R7 and R8 is connected between the output of voltage stabilizer 20 and negative bus 18, the junction between R7 and R8 being connected to the noninverting input terminal of comparator operational amplifier 307. The voltage on this noninverting input establishes an upper power level limit. As long as the voltage on the inverting input is smaller than the voltage on the noninverting input, a positive output will be delivered from the comparator and when the upper limit is reached the polarity of the comparator output will be reversed. The reverse current will flow through a diode D3 and provides a short-circuit path across the input terminals of the gating circuit 34 and thus inhibits it from generating gating-on pulses.

The voltage divider 309 formed by a pair of series-connected resistors R9 and R10 is connected between the voltage divider 310 and the junction between resistors VR1 and R2 of the divider 308. The comparator 306 has its noninverting input connected to the junction between resistors R9 and R10 to provide lower power level limit so as to deliver a control signal when the power converter is operated with no loading or a false small loading such as spoon or fork. The comparator 306 produces a positive output when the detected power level is below the lower setting level and applies it to a second delay circuit 313. This delay circuit includes an n-p-n transistor T having its collector-emitter path connected between the DC supply bus 28 through resistor R11 and negative bus 18, and a capacitor C2 connected across the base and emitter electrodes of the transistor. As previously described, during the initial start-up period of operation, the detected power level is low and the comparator 306 will produce a positive output. The initial positive output is stored in capacitor C2 and the transistor T remains nonconductive until C2 is fully charged whereupon the converter is ready to start operation. At normal power level, comparator 306 produces a negative output which is prevented from being applied to the diode D2 since the base of transistor T is biased negative with respect to the emitter. When the detected power level is below the lower power level setting, the base of transistor T will be biased positively with respect to its emitter and provides a conducting path between diode D2 and negative bus 18 to thereby disable the gating circuit 34.

Figure 6:
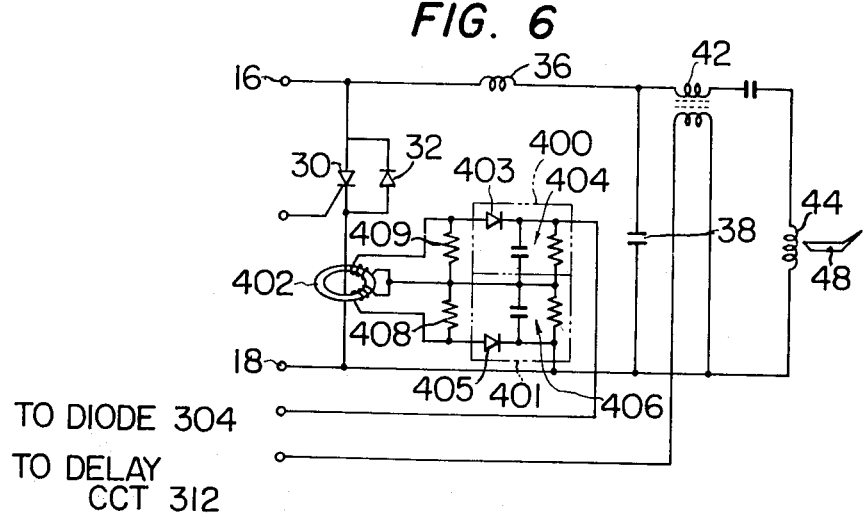
FIG. 6 is a modification of a power detector of the circuit of FIG. 5.

FIG. 6 shows a modified form of the output power detector 302 which, in this case, includes a ferrite ring core and a pair of series-connected secondary windings coiled around the core. Rectifier circuits 400 and 401 are connected respectively to one of the windings of the current transformer 402. Through the ring core of the transformer is passed the circuit which connects the SCR and diode pair to the negative bus line. The flow of forward current through the SCR 30 during the first half cycle of high frequency oscillation produces a current that flows through a diode 403 and is filtered through an RC network 404, while the reverse flow of current during the second half cycle of the oscillation produces a current that flows through a diode 405 and is filtered through an RC network 406. The filter networks 404 and 405 are connected in series across the negative bus 18 and diode 304 to develop a DC output which represents the difference between the voltages on the respective RC networks. The DC output thus represents the actual power withdrawn from the induction heating coil 44 due to loading. Resistors 409 and 408 are connected across the windings to provide a gradually increasing saturation characteristic on the magnetization curve of the ferrite core in order that the induced voltage on each input of the rectifier circuits 400 and 401 varies in proportion to the amplitude of the energization current.

Figure 7:
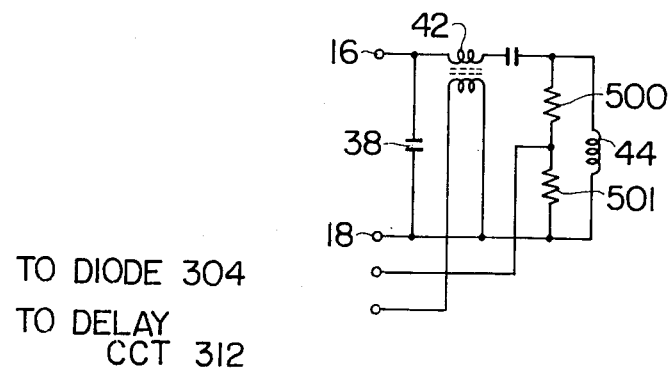
FIG. 7 is a further modification of the power detector.

Alternatively, output power level is detected by coupling a pair of series-connected high resistances 500 anf 501 across the induction heating coil 44 as shown in FIG. 7. A lead is taken from the junction between the two resistors to diode 304.

The foregoing description shows only preferred embodiments of the present invention. Various modifications are apparent to those skilled in the art without depart from the scope of the present invention. For example, the saturable reactor 42 may also be connected in parallel circuit relation with the induction heating coil 44 or a plurality of induction heating coils may be employed for a single power converter with individual mechanical moving system for each induction heating coil. Therefore, the scope of the invention is only limited by the appended claims, and the embodiments shown and described are only illustrative, not restrictive.

What is claimed is:

1. An induction heating apparatus comprising:
   a power converter adapted to connect to a source of alternating voltage for converting the frequency of the source voltage to a high frequency, including a gated switching device, a resonant circuit including an induction heating coil connected to the gated switching device, a gating circuit providing gating-on pulses that drive said gated switching device into conduction successively, whereby an energization current substantially at said higher frequency is produced in said induction heating coil, a zero crossover detector for detecting the instant when said alternating voltage is substantially at zero to trigger said gating circuit to generate a train of gating-on pulses, first delay means for delaying the generation of said gating-on pulses for a predetermined period from the instant when said power converter is connected to the alternating voltage source, whereby said induction heating coil is electromagnetically coupled to a magnetic cooking ware placed in overlying relation therewith to be heated;
   a transformer having a closed magnetic circuit and provided with three parallel limbs connected together by transverse members, a control winding arranged on the central limb and series-connected load windings wound in opposite directions and arranged one on each outer limb and connected in series with said induction heating coil to thereby be energized by said energization current, said transformer including an air gap in each of said outer limbs so that the variation of a current through said control winding linearly alters the magnitude of the current passing through said load windings; and
   a power control circuit comprising means for detecting electrical power representative of said electromagnetic coupling, means for comparing the detected power with a reference value to produce a DC control current with which said control winding is energized, manually adjusting means for controlling said reference level, and second delay means connected between said comparing means and said control winding for delaying the application of said DC control current for a predetermined period from the instant when said power converter is connected to said source voltage for energization.

2. An induction heating apparatus as claimed in claim 1, wherein said comparing means comprises an operational amplifier having its noninverting input connected to said reference level and its inverting input connected to said detecting means, and wherein said second delay means comprises an RC time constant network and a diode poled in a direction to charge the capacitive element of the RC network, and a high resistance discharging path connected across the capacitive element.

3. An induction heating apparatus as claimed in claim 1, further comprising a second power control circuit comprising means for comparing the detected level with a reference level to produce an inhibit signal when the detected level is below the reference level, means for disabling said gating circuit in response to said inhibit signal, and means for delaying the disabling operation for a predetermined period from the instant said power converter is connected to the voltage source.

4. An induction heating apparatus as claimed in claim 3, wherein said second power control circuit comprises an operational amplifier having its non-inverting input connected to a reference voltage and its inverting input connected to said detecting means, a transistor having a collector-emitter path connected to said gating circuit to provide a short circuit to disable the trigger from said zero crossover detector and having its gate connected to the output of the operational amplifier, and a capacitor connected between the gate and emitter electrodes of the transistor.

5. An induction heating apparatus as claimed in claim 1, further comprising a second power control circuit comprising means for comparing the detected level with a reference level to produce an inhibit signal when the detected level is above the reference level and means for disabling the gating circuit in response to said inhibit signal.

6. An induction heating apparatus as claimed in claim 1, wherein said cores are made of ferrite.

7. An induction heating apparatus as claimed in claim 1, wherein said air gaps are filled with an insulating member of high permeability.

8. An induction heating apparatus as claimed in claim 1, wherein said level detecting means includes a first current transformer connected to the input power side of the power converter and a second current transformer connected to the output power side of the power converter.

9. An induction heating apparatus as claimed in claim 8, wherein said second current transformer is provided with a ferrite ring core and a winding coiled thereabout, and wherein through said ring core is passed the energization current.

10. An induction heating apparatus as claimed in claim 8, wherein said second current transformer is provided with a ferrite ring core and a pair of series-connected windings, said energization current is passed through said ring core, and wherein said level detecting means includes a first and a second rectifier each connected to one of opposite ends of said series-connected windings such that the first rectifier passes a current during the first half cycle of the high frequency energization current and the second rectifier passes a current during the second half cycle of the high frequency energization current, and a filter network connected to the outputs of the first and second rectifiers and to the junction between said windings so that currents passing through said filter network represent the difference between the currents that pass through said first and second rectifiers.

11. An induction heating apparatus as claimed in claim 1, wherein said level detecting means comprises a pair of series-connected resistance connected across the induction heating coil, and means connecting the junction between said resistances to said comparing means.

12. An induction heating apparatus as claimed in claim 1, wherein said center limb of said transformer is laterally movable.

* * * * *